United States Patent [19]

Hamilton

[11] 4,130,631
[45] Dec. 19, 1978

[54] BN BONDED BN FIBER ARTICLE FROM BORIC OXIDE FIBER

[75] Inventor: Robert S. Hamilton, Youngstown, N.Y.

[73] Assignee: The Carborundum Company, Niagara Falls, N.Y.

[21] Appl. No.: 773,588

[22] Filed: Mar. 2, 1977

[51] Int. Cl.$^2$ .................. C01B 35/08; H01M 8/14
[52] U.S. Cl. ........................... 423/290; 106/39.5; 106/55; 429/136; 429/102
[58] Field of Search .............. 423/290; 106/39.5, 55; 428/366; 429/136, 212, 102

[56] References Cited

U.S. PATENT DOCUMENTS

| 3,510,359 | 5/1970 | Selover et al. | 429/136 |
|---|---|---|---|
| 3,620,780 | 11/1971 | Economy et al. | 106/55 |
| 3,634,132 | 1/1972 | Camahort | 428/366 |
| 3,837,997 | 9/1974 | Economy et al. | 423/290 X |
| 3,915,742 | 10/1975 | Battles et al. | 429/136 X |

FOREIGN PATENT DOCUMENTS 357185  1/1971  U.S.S.R. ................................ 106/55

*Primary Examiner*—G. O. Peters
*Attorney, Agent, or Firm*—David E. Dougherty; Raymond W. Green; Michael L. Dunn

[57] ABSTRACT

A boron nitride bonded boron nitride fiber article and the method for its manufacture which comprises forming a shaped article with a composition comprising boron oxide fibers and boric acid, heating the composition in an anhydrous gas to a temperature above the melting point of the boric acid and nitriding the resulting article in ammonia gas.

32 Claims, No Drawings

BN BONDED BN FIBER ARTICLE FROM BORIC OXIDE FIBER

BACKGROUND OF THE INVENTION

The invention described herein was made in the course of, or under a sub-contract under a contract with the U.S. Atomic Energy Commission.

(a) Field of the Invention

This invention relates to boron nitride fibers and more particularly relates to articles manufactured from integral three dimensional boron nitride fiber mats. The invention further relates to the method for the manufacture of such articles.

(b) History of the Prior Art

Boron nitride (BN) possesses a number of highly desirable properties which render it useful in a wide variety of applications. Its high electrical resistivity coupled with its high thermal conductivity make it especially useful in electrical and electronic applications requiring a material which simultaneously acts as an electrical insulator and a thermal conductor. Its excellent thermal shock resistance renders it effective as a refractory at temperature up to 1,600° C. or higher in a non-oxidizing atmosphere and at temperatures as high as 700° to 900° C. in air. It is highly corrosion resistant, being inert to most organic liquids and many corrosive chemicals and displaying excellent resistance to attack by various molten metals. Furthermore, because of its low dissipation factor over a wide temperature range, this material is well suited for use in microwave and radar dielectric components (radar windows). Various methods for the manufacture of boron nitride fibers are known in the prior art, for example, it is disclosed in U.S. Pat. No. 3,429,722 issued to James Economy et al. that boron nitride fibers can be manufactured by heating boron oxide fibers in an ammonia atmosphere.

U.S. Pat. No. 3,668,059 issued to James Economy et al. discloses a boron nitride fiber having a high Young's modulus of elasticity which is prepared by heating a partially nitrided fiber in an inert atmosphere at a temperature of at least 1800° C. under longitudinal tension.

While it is well known in the prior art that boron nitride fibers can be manufactured having good characteristics, the use of such fibers has been limited due to difficulties in forming three dimensional articles from the fibers. Almost any substance which is used to bond the fibers to each other has properties which are inferior to the properties of the boron nitride fibers thus resulting in a bonded article which is unsuitable for use in many applications. For example, when a boron nitride fiber article, which is bound by prior art materials, is used as a separator material in a corrosive cell electrolyte such as molten lithium chloride and potassium chloride, the fibers separate from each other due to the inability of the binding material to withstand the high temperature corrosive environment.

An attempt has been made prior to the present invention to form articles from boron nitride bonded boron nitride fibers by heating boron nitride fibers impregnated with boric acid solution to elevated temperatures in ammonia as disclosed in U.S. Pat. No. 3,837,997 to James Economy et al.

In addition to the above-noted references relating to boron nitride fibers, shaped boron nitride, usually non-porous, bodies have also been prepared in the past. Such articles are disclosed, for example, by Taylor, U.S. Pat. No. 2,888,325, which teaches the use of a multiple stage nitriding process comprising intermittant addition of oxygen-containing boron compound at intermediate stages of nitriding, followed by further nitriding.

Furthermore, such articles have been prepared by sintering boron nitride fibers in the presence of boron oxide.

None of these methods resulted in a non-woven porous boron nitride fiber article having sufficient strength for use as an electric cell separator in molten lithium chloride environments. These bonding processes sometimes resulted in a boron nitride fiber of reduced strength or the bond was of insufficient strength or durability to secure the fibers to each other in molten lithium chloride environments.

BRIEF DESCRIPTION OF THE INVENTION

In accordance with this invention, there is now provided a shaped article comprising fused boron nitride fibers, which retains the porous characteristics of a fiber mat and in addition has good dimensional strength, is relatively non-brittle when compared with prior art boron nitride fiber articles and retains the high heat and chemical resistance of boron nitride fiber.

In accordance with the invention, the boron nitride article may be manufactured by forming a shaped article with a composition comprising boron oxide ($B_2O_3$) fibers and from about 0.5 to about 40 weight percent of boric acid. The article is then heated in an anhydrous gas selected from the group consisting of inert gases, nitrogen, ammonia and mixtures thereof to a temperature above the melting temperature of the boric acid for a time sufficient to melt at least some of the boric acid to the boron oxide fibers. The article is heated for an insufficient time and to an insufficient temperature to destroy the fibers by melting or decomposition. Simultaneously with or subsequent to the heating of the article to melt the boric acid, the article is heated in an ammonia atmosphere to a sufficient temperature and for a sufficient time to convert the boron oxide and boric acid to boron nitride. The resulting article comprises boron nitride fibers fused to each other with boron nitride which article has good strength, good dimensional stability, good chemical resistance, and retains the desirable characteristics, i.e., porosity, of a fiber article.

The boron oxide fibers may be coated with the boric acid or may be blended with particulate boric acid prior to forming the article. The fibers may be coated for example by exposing the fibers to a humid environment thus causing the surface of the fibers to convert to boric acid or, for example, by dusting the fibers with particulate boric acid having a sub micron average particle size.

Alternatively, the fiber need not be coated with boric acid but can be blended with boric acid, for example, by blending from about 0.5 to about 40 weight percent of boric acid with from about 60 to about 99.5 weight percent of boron oxide fibers. The resulting blend or coated fiber is then formed into a shaped article.

In accordance with this invention, it is understood that a combination of coating and blending as above described can be used.

DETAILED DESCRIPTION OF THE INVENTION

The article manufactured in accordance with the method of the invention can be of any desirable shape.

For example, the article may be spherical, cubic, cylindrical, oval, a bar or in the form of a plate or mat. The article may be provided with holes or contours if desired for a particular application. The article is believed to comprise a body of boron nitride fibers which are secured to each other at fiber intersections by boron nitride.

One example of a desirable article manufactured in accordance with the process of the invention, is a fiber mat which has sufficient porosity, strength, and chemical resistance to be used as a separator in lithium-sulfide batteries utilizing molten lithium chloride and molten potassium chloride as the electrolyte.

In accordance with one method of the invention from about 0.5 to about 40 weight percent and preferrably from about 2 to about 20 weight percent of boric acid is blended with from about 60 to about 99.5 weight percent and preferrably from about 80 to about 98 weight percent of boron oxide fibers. The most desirable concentration of boric acid is from about 10 to about 20 weight percent and the most desirable concentration of boron oxide fibers is from about 80 to about 90 weight percent.

The boric acid is particulate in form and is usually in the form of crystals.

Alternatively the boron oxide fibers may be exposed to a humid atmosphere so the surface of the fiber converts to boric acid. A sufficiently humid atmosphere is anything above 30 percent and preferrably 50 percent relative humidity and the required time of exposure is from five minutes to one day depending upon the relative humidity.

Boric acid as used herein is intended to include all boron oxide hydrates and mixtures thereof including orthoboric acid ($H_3BO_3$), metaboric acid ($HBO_2$) and tetraboric acid ($H_2B_4O_7$).

The boron oxide fibers have a maximum diameter of 30 microns, more desirably a maximum diameter of 20 microns and most desirably, a maximum diameter of about 10 microns.

The boron oxide fibers may be made by any known method, including spinning the boron oxide ($B_2O_3$) fibers from a $B_2O_3$ melt and winding the resulting fibers upon a reel in an atmosphere protected from moisture. Alternatively the $B_2O_3$ fibers may be blown in staple form from a $B_2O_3$ melt.

The boron oxide fibers may be blended with boric acid by any suitable means such as by slurrying the fibers in an anhydrous liquid such as a petroleum distillate, e.g., kerosene, which boils below 100° C. and subsequently removing the liquid from the fibers. Other methods for blending include blowing the fibers and boric acid into a container or mixing in a fluidized bed.

After the fibers are blended or coated with boric acid, the resulting composition is formed into a shaped article by any suitable means. For example, the shaped article may be formed by pressing the composition into the appropriate shape. Molds may be used if desired during the pressing procedure. Fiber mats and fiber boards can be manufactured by pressing the blend between flat plates. Pressure which can be used during the forming procedure preferrably ranges between about 0.5 and about 2.5 kilograms per square centimeter absolute. Shaped articles can also be formed from the blend by casting a slurry of the blend in an anhydrous liquid followed by subsequent evaporation of the liquid. The slurry may be cast into a mold or on to a flat surface.

After the article is formed, it is heated in an anhydrous gas selected from the group consisting of inert gases, nitrogen, ammonia and mixtures thereof to a temperature above the melting temperature of the boron oxide for a time sufficient to fuse at least some of the boric acid to the boron oxide fibers and for a time insufficient to destroy the boron oxide fibers by melting. In general, the heating temperature is from about 160° to about 460° C. Desirably the heating temperature is from about 200° to about 450° C. since higher temperatures tend to result in localized rather than uniform fusion of the fibers to each other by boric acid throughout the article, particularly when heat transfer is not substantially enhanced by flow of heated gas through the article. In addition, at temperatures near 460° C. some localized melting of boron oxide fibers may occur. Lower temperatures increase processing time.

The time required to fuse the fibers together, without destroying the fibers by melting or decomposition, is dependent upon the fusion temperature used and heat transfer methods employed. Good gas flow, e.g., at least about 0.03L and preferrably 0.5L per minute per square centimeter of article per millimeter of thickness, throughout the article is needed to remove the water which is released from the boric acid. If the water is not removed, it tends to react with and deteriorate the $B_2O_3$ fibers. At higher temperatures, i.e., from about 400° C. to 460° C., the time sufficient to fuse at least some of the boric acid to the boron oxide fibers is generally between about 3 and about 30 minutes at high gas flow.

In general, it has been found that a slow temperature rise to the desired peak temperature over the heating time results in a more uniform article.

At lower temperatures, i.e., from about 160° C. to about 200° C., longer heating times are required for sufficient fusion of the boric acid to the boron oxide fibers. However, even at the lower temperatures, good heat transfer between the fibers is desirable to obtain a uniform article. At lower temperatures, the sufficient time to fuse the fibers is generally between about 30 minutes and 3 hours. Again, it has been found that a more uniform article is obtained when the heating temperature is slowly elevated to the peak temperature over the heating time.

The heating temperature to fuse the fibers is preferrably from about 240° to about 265° C. since lower temperatures tend to result in a weak article and higher temperatures tend to result in a brittle article.

The heating of the article is an ammonia atmosphere to a sufficient temperature and for a sufficient time to convert the boric acid and boron oxide fibers to boron nitride may occur simultaneously with or subsequent to the heating of the article in an anhydrous gas to fuse the boric acid to the boron oxide.

In general, the sufficient temperature to convert the boric acid and boron oxide fibers to boron nitride in an ammonia atmosphere is any temperature above the reaction temperature of ammonia with boron oxide up to the melting temperature of boron nitride. In general, the sufficient temperature to convert the boron oxide and boric acid to boron nitride is from about 200° C. to about 900° C. During the melting and conversion step it is believed that boric acid first converts to boron oxide which then converts to boron nitride during the converstion step.

The time which is required to convert the boron oxide and boric acid to boron nitride depends mainly upon the diffusion rate of ammonia into boron oxide which in turn is dependent upon the concentration of ammonia gas and the flow or contact of the ammonia gas with the boron oxide and to some extent, the gas temperature. In general, the sufficient time to convert the boron oxide at temperatures between about 200° C. and about 900° C. in ammonia gas at atmospheric pressure with sufficient flow of ammonia through the fibers to provide excess ammonia gas reactant, is from about 2 to about 24 hours. Longer times may be used without detriment to the article but have not been found to be necessary.

The following examples serve to illustrate the process and article of the invention without limiting the invention:

EXAMPLE 1

Ten grams of $B_2O_3$ fibers having an average diameter of about $3\mu$ are blended in a food blender into sufficient kerosene to cover the fibers. Prior to blending, the fibers are exposed to air at 70 percent relative humidity for two hours to cause the formation of a boron oxide hydrate coating on the fiber surface. The blend is cast upon a 4 centimeter square stainless steel screen and rapidly heated to 250° C. in a nitrogen flow of 10L per minute to drive off the kerosene and fuse the fibers to each other. After holding the temperature at 250° C. for 20 minutes, the resulting sheet is removed from the screen and nitrided in $NH_3$ at atmospheric pressure and at a $NH_3$ flow of 20L per minute. The temperature during nitriding is raised at 40° C. per hour to 900° C.

The resulting sheet is found to be strong, flexible and resistant to molten lithium chloride environments.

EXAMPLE 2

Example 1 is repeated except the boron oxide fiber is protected from a humid atmosphere and 0.5 grams of orthoboric acid powder is blended into the kerosene with the fibers.

The resulting sheet is strong but somewhat thicker and less flexible near the bottom. (The portion touching the lower screen).

What is claimed is:

1. A method for manufacturing a boron nitride article comprising:
   (a) blending from about 0.5 to about 40 weight percent of boric acid with from about 60 to about 99.5 weight percent of boron oxide fiber;
   (b) forming a shaped article with the resulting blend;
   (c) heating the article in an anhydrous gas selected from the group consisting of inert gases, nitrogen, ammonia and mixtures thereof to a temperature above the melting temperature of the boric acid and below about 265° C. for a time sufficient to melt at least some of the boric acid to the fibers; and
   (d) heating the article in an ammonia atmosphere to a sufficient temperature and for a sufficient time to convert essentially all of the boric acid and boron oxide to boron nitride.

2. The method claimed in claim 1 wherein from about 2 to about 20 weight percent of boric acid is blended with from about 80 to about 98 weight percent of fiber.

3. The method of claim 2 wherein the boric acid is in particulate form.

4. The method claimed in claim 1 wherein the heating to melt the boric acid and the heating to convert boric acid and boron oxide to boron nitride are done simultaneously in an ammonia atmosphere.

5. The method of claim 2 wherein the boric acid is orthoboric acid.

6. The method of claim 2 wherein the boric acid is tetraboric acid.

7. The method of claim 6 wherein said article is heated to between about 160° C. and about 460° C. for from about three minutes to about three hours to melt the boric acid and said gas is an inert gas or nitrogen.

8. The method of claim 7 wherein the sufficient temperature to convert boric acid and boron oxide is from about 200° C. to about 900° C. and the sufficient conversion time is from about 2 to about 24 hours.

9. The method of claim 8 wherein said boric acid is in particulate form and the average particle size is below about $100\mu$.

10. The method claimed in claim 2 wherein from about 80 to about 90 weight percent boron oxide fiber is blended with from about 10 to about 20 weight percent of boric acid and said heating temperature is from about 240° C. to about 265° C.

11. The method claimed in claim 2 wherein the fibers are blended with boric acid by slurrying the fibers and boron oxide in an anhydrous liquid and removing the liquid from the fibers.

12. The method claimed in claim 11 wherein the liquid is petroleum distillate having a boiling point below about 100° C. and the liquid is removed by evaporation.

13. The method claimed in claim 2 wherein the fibers and boric acid are blended by blowing them randomly into a container.

14. The method claimed in claim 2 wherein the fibers and boric acid are blended by mixing them in a fluidized bed.

15. The method of claim 1 wherein the shaped article is a fiber mat.

16. The method of claim 6 wherein the shaped article is a fiber mat.

17. The method of claim 1 wherein from about 0.5 kilograms per square centimeter to about 2.5 kilograms per square centimeter of absolute pressure is applied to said shaped article during said heating to melt the boric acid.

18. The method of claim 6 wherein from about 0.5 kilograms per square centimeter to about 2.5 kilograms per square centimeter of absolute pressure is applied to said shaped article during said heating to melt the boric acid.

19. A shaped article manufactured in accordance with the method of claim 1.

20. A fiber mat manufactured in accordance with the method of claim 6.

21. A method for manufacturing a boron nitride article which comprises:
   (a) forming a shaped article with a composition comprising boron oxide fibers coated with from about 0.5 to about 40 weight percent of boric acid;
   (b) heating the article in an anhydrous gas selected from the group consisting of inert gases, nitrogen, ammonia and mixtures thereof to a temperature above the melting temperature of the boric acid and below about 265° C. for a time sufficient to melt at least some of the boric acid to the fibers; and
   (c) heating the article in an ammonia atmosphere to a sufficient temperature and for a sufficient time to convert essentially all of the boric acid and boron oxide to boron nitride.

22. The method of claim 21 wherein the boric acid is tetraboric acid.

23. The method of claim 21 wherein the boric acid is orthoboric acid.

24. The method of claim 21 wherein the boric acid is metaboric acid.

25. The method of claim 21 wherein the temperature above the melting temperature of the boric acid and below the melting or decomposition temperature of the boron oxide fiber is between about 160° C. to about 460° C.

26. The method of claim 25 wherein said sufficient time to melt the boric acid is from about three minutes to about three hours.

27. The method of claim 26 wherein said sufficient temperature to convert the boric acid and boron oxide fiber to boron nitride is from about 200° C. to about 900° C. and the sufficient time to convert the boric acid and boron oxide fiber is from about 2 to about 24 hours.

28. The method of claim 26 wherein the sufficient temperature to melt the boron oxide is from about 240° C. to about 265° C.

29. A flexible article manufactured in accordance with the method of claim 21.

30. A flexible article manufactured in accordance with the method of claim 26.

31. In an electric cell incorporating molten lithium chloride and a porous separator, the improvement wherein said separator comprises a flexible boron nitride fiber mat manufactured by:
   (a) blending from about 0.5 to about 40 weight percent of boric acid with from about 60 to about 99.5 weight percent of boron oxide fiber;
   (b) forming a shaped mat with the resulting blend;
   (c) heating the mat in an anhydrous gas selected from the group consisting of inert gases, nitrogen, ammonia and mixtures thereof to a temperature above the melting temperature of the boric acid and below about 265° C. for a time sufficient to melt at least some of the boric acid to the fibers; and
   (d) heating the mat in an ammonia atmosphere to a sufficient temperature and for a sufficient time to convert essentially all of the boric acid and boron oxide to boron nitride.

32. The electric cell of claim 31 wherein from about 2 to about 20 weight percent of boric acid is blended with from about 80 to about 98 weight percent of fiber.

* * * * *